(12) United States Patent  (10) Patent No.: US 8,330,899 B2
Chang  (45) Date of Patent: Dec. 11, 2012

(54) PHOTOFLASH

(75) Inventor: Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 426 days.

(21) Appl. No.: 12/768,685

(22) Filed: Apr. 27, 2010

(65) Prior Publication Data

US 2011/0157514 A1 Jun. 30, 2011

(30) Foreign Application Priority Data

Dec. 25, 2009 (CN) .......................... 2009 1 0312238

(51) Int. Cl.
*G02F 1/1335* (2006.01)
*G03B 15/02* (2006.01)
(52) U.S. Cl. ................. 349/70; 349/61; 362/16; 362/18
(58) Field of Classification Search ...................... 349/70
See application file for complete search history.

(56) References Cited

U.S. PATENT DOCUMENTS 5,358,412 A * 10/1994 Maurinus et al. ............... 439/66
5,673,999 A * 10/1997 Koenck ......................... 362/263

* cited by examiner

*Primary Examiner* — Wen-Ying P Chen
(74) *Attorney, Agent, or Firm* — Altis Law Group, Inc.

(57) ABSTRACT

A photoflash includes a substrate, a flashtube and a light field control member. The substrate serves as a bottom of a cavity formed there-above and having a plurality of circuits embedded in the bottom of the cavity. The flashtube is received in the cavity and electrically connected to the circuits. The control member includes a liquid crystal panel, a plurality of transparent electrodes attached on opposite of the liquid crystal panel and a control circuit attached on the panel and electrically connected to the electrodes. The liquid crystal panel is mounted on the substrate and covers the cavity, while the control circuit is electrically connected to the circuits of the substrate. The control circuit is configured for controllably powering transparent electrodes thereby adjusting the arrangement of liquid crystal cells in particular regions of panel to control which portions of the light emitted from the flashtube will pass through the light field control member.

13 Claims, 2 Drawing Sheets

PHOTOFLASH

BACKGROUND

1. Technical Field

The disclosure relates to photoflashes and, particularly to a photoflash with variable light field.

2. Description of Related Art

The typical photoflash has a fixed light field, i.e., the area that can be effectively illuminated by the flash, which is unsuitable for lighting some particular areas or objects where a narrower or wider light field is required. Therefore, a photoflash with variable light field is needed.

DETAILED DESCRIPTION

Figure 1:
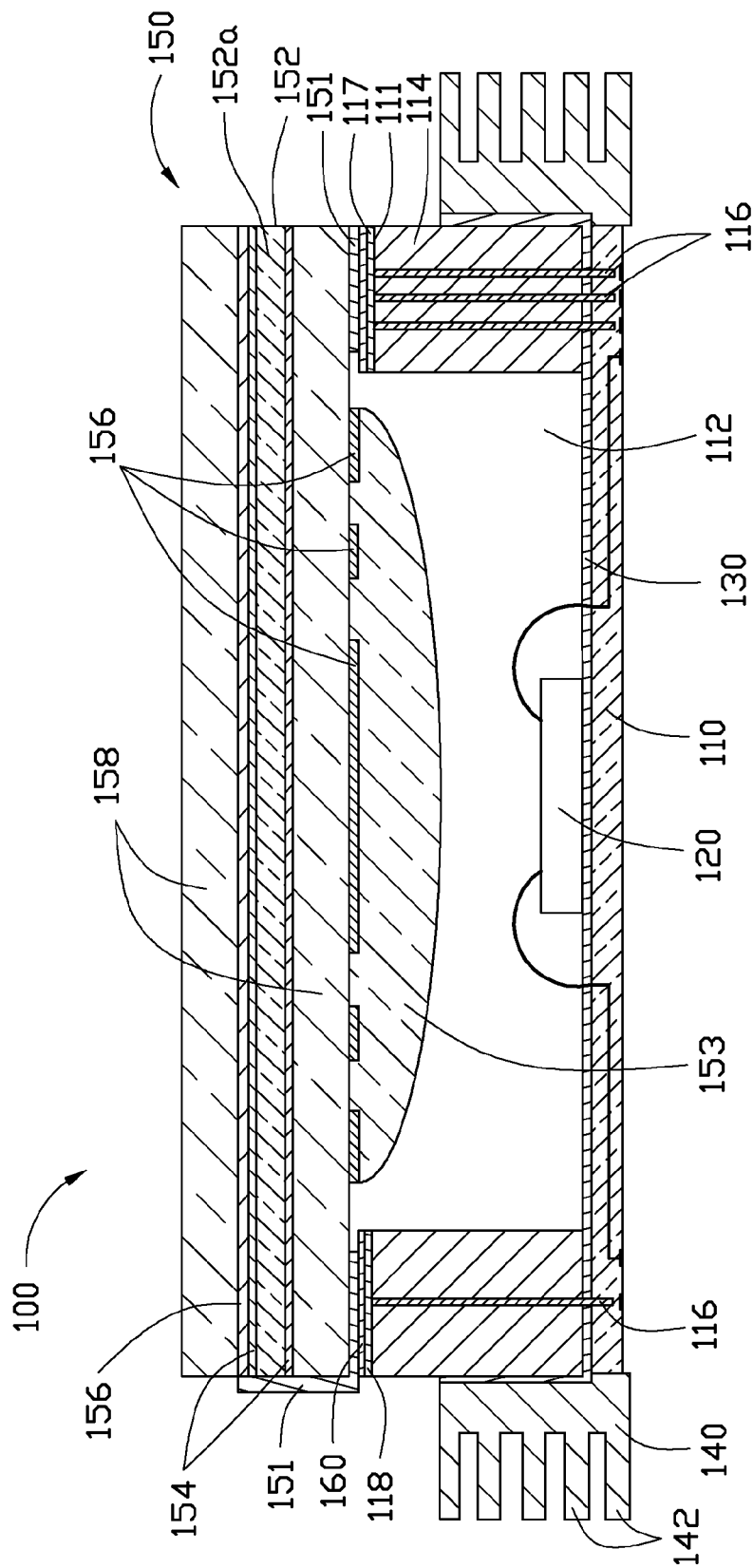
FIG. 1 is a cross sectional view of a photoflash in accordance with an exemplary embodiment.
Figure 2:
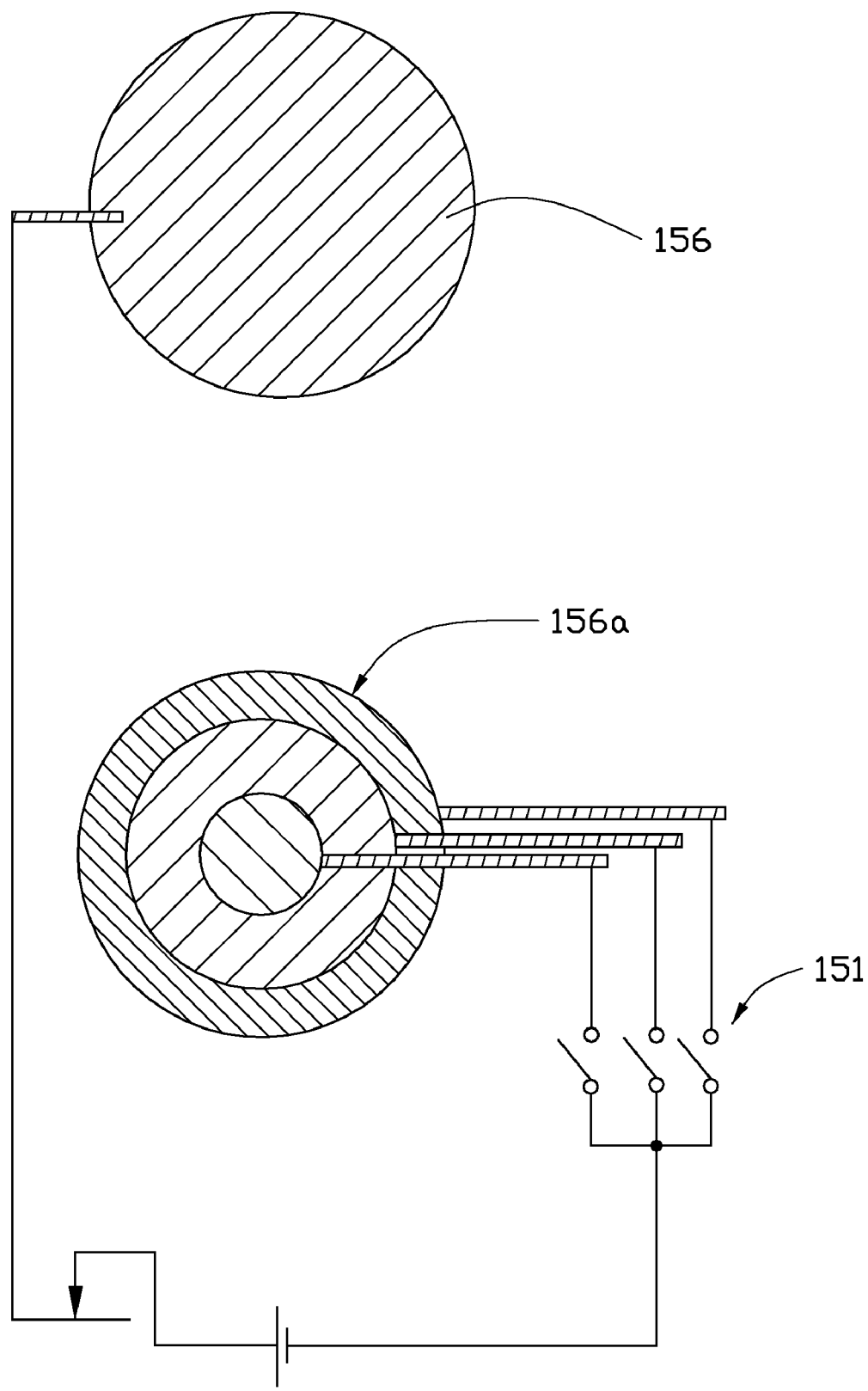
FIG. 2 is a schematic diagram of an electrically conductive layer of the photoflash of FIG. 1.

Referring FIGS. 1 and 2, a photoflash 100 in accordance with an exemplary embodiment is shown. The photoflash 100 includes a substrate 110, a flashtube 120, a heat conductive member 130, a heat dispersion member 140, and a light field control member 150. A cavity 112 is defined above an upper surface 111 of the substrate 110, for accommodating the flashtube 120. The substrate 110 includes some circuits (not shown) embedded therein for supplying power and controlling signals to the flashtube 120 and the light field control member 150. The flashtube 120 is received in the cavity 112, and is electrically connected to the circuits of the substrate 110. The heat conductive member 130 is arranged on the bottom of the cavity 112 and heat-conductively contacts the flashtube 120. Two opposite ends of the heat conductive member 130 extend out of the substrate 110, and heat-conductively contact the heat dispersion member 140 that is mounted on the side surfaces of the substrate 110, thus to cool the flashtube 120 and the whole photoflash 100. The light field control member 150 covers the cavity 112 of the substrate 110 and electrically connects to the circuits of the substrate 110. The light field control member 150 includes a liquid crystal panel 152, transparent electrodes 156, and a control circuit 151. The transparent electrodes are electrically connected to the control circuit, each corresponding to a particular region of the liquid crystal panel. The liquid crystal panel is mounted on the substrate and covers the cavity 112 of the substrate 110. The control circuit is electrically connected to the circuits of the substrate 110 and controllable for powering predetermined portions of the transparent electrodes thereby adjusting orientation of liquid crystal cells in the liquid crystal panel, to allow and control which portions of the light emitted from the flashtube 120 pass through the light field control member 150 and in what direction.

The substrate 110 is made of ceramic material. A support wall 114 surrounds the cavity 112 and supports the light field control member 150. A number of electrically conductive poles 116 are embedded in the support wall 114, each insulated from the others and electrically connected to a corresponding one of the circuits. A first electrically conductive pad 117 and a second electrically conductive pad 118 are mounted on the top surfaces of the support wall 114, at two opposite sides of the cavity 112 respectively, and electrically connect the control circuit 151 to the conductive poles 116.

The heat conductive member 130 extends through the support wall 114 to the outside. The heat conductive member 130 is used for transporting the heat generated by the flashtube 120 to the outside. The heat conductive member 130 is made of heat conductive material such as aluminum, copper, iron or the like. Alternatively, the heat conductive member 130 can be a heat pipe.

The heat dispersion member 140 is mounted to the outside of the support wall 114 and heat-conductively contacts the heat conductive member 130. The heat dispersion member 140 is configured for quickly dispersing the heat transported out by the heat conductive member 130 from the flashtube 120. Exemplarily, the heat dispersion members 140 are heat sinks with a number of fins formed thereon. Alternatively, if the flashtube 120 is a luminescent light/lamp, the heat conductive member 130 as well as the heat dispersion member 140 can be omitted to lower costs.

The light field control member 150 further includes two polarizing plates 154 and two glass substrates 158. One of the polarizing plates 154, one of the transparent electrodes 156, and one of the glass substrates 158 are successively formed on one side of the liquid crystal panel 152. On the other side of the liquid crystal panel 152 are formed in succession, the other polarizing plate 154, the other glass substrate 158, and the remaining transparent electrodes 156. The transparent electrodes 156 are electrically connected to the first and second electrically conductive pads 117 and 118 by the control circuit 151, thereby constructing an electrical field to effect/change the arrangements of the liquid crystal cells of the liquid crystal panel 152.

The liquid crystal panel 152 consists of two opposite glass plates (not labeled), two aligning films attached on facing surfaces of the two glass plates correspondingly, and liquid crystal cells 152a sealed between the two glass plates. When a voltage is applied to the transparent electrodes 156, the orientations of the liquid crystal cells can be changed thereby stopping or changing the angle of light emitted by the flashtube 120.

The polarizing plates 154 each have an optical axis perpendicular to the other.

The transparent electrodes 156 are indium tin oxide (ITO) films. In alternative embodiments, the transparent electrodes 156 may be arranged at other suitable locations such as layered on the glass substrates 158. Exemplarily, referring to FIG. 2, one of the transparent electrodes 156 is configured as a series of concentric conductive rings 156a. Each of the rings 156a corresponds to a particular region of the liquid crystal panel 152 and is electrically connected to the control circuit 151. The rings are capable of being selectively powered/controlled by the control circuit 151 to form various desired/needed electrical fields in the corresponding regions of the liquid crystal panel 152, thereby controlling the liquid crystal cells 152a in the corresponding regions.

One of the glass substrates 158 is mounted on the substrate 110 and seals the cavity 112. A hemispheric resin lens 153 is mounted on the surface of the glass substrate 158, facing the cavity 112 of the substrate 110 for converging the transmitted light. Alternatively, a fresnel lens can be attached on the glass substrate 158 instead of the hemispheric lens 153. The fresnel lens may be nano-imprinted on the glass substrate 158.

The control circuit 151 is electrically connected to the first and second conductive pads 117 and 118 through the anisotropic conductive materials 160. The control circuit 151 is electrically connected to an external control device (not shown) from which the control circuit 151 receives control signals and power.

In use, the control circuit 151 gets commands and power from the external control device to control the transparent electrodes 156 to construct a desired electrical field to change optical refractive indexes of the liquid crystal cells 152*a* to effect the amount and angle of light transmitted to outside to adjust the light field of the photoflash 100. In detail, if a wider than usual light field is needed to light a subject, the voltage applied on the transparent electrodes 156 is increased while all of the concentric conductive rings 156*a* are powered to maximize the luminous flux of the liquid crystal panel 150. In contrast, if a narrower than usual light field is required, the voltage applied on the transparent electrodes 156 is reduced so that only one or some of the concentric conductive rings 156*a* are selectively powered to minimize the luminous flux of the liquid crystal panel 150. Alternatively, the control circuit 151 in the present disclosure can be positioned at the input ends of the first and second conductive pads 117 and 118 instead at the output ends of the first and second conductive pads 117 and 118.

In the present disclosure, the light field of the photoflash 100 is adjustable thereby providing great convenience for users.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A photoflash comprising:
   a substrate serving as a bottom of a cavity formed thereabove and having a plurality of circuits embedded in the bottom of the cavity;
   a flashtube received in the cavity, and electrically connected to the circuits of the substrate; and
   a light field control member comprising: a liquid crystal panel, a plurality of transparent electrodes and a control circuit; the electrodes being attached on opposite sides of the liquid crystal panel, each corresponding to a particular region of the liquid crystal panel and electrically connected to the control circuit that is attached on the liquid crystal panel where none of electrodes are attached; the liquid crystal panel being mounted on the substrate and covering the cavity; the control circuit being electrically connected to the circuits of the substrate; the control circuit being configured for selectively powering the transparent electrodes thereby adjusting the orientation of liquid crystal cells in the corresponding particular regions of liquid crystal panel to allow and control which portions of the light emitted from the flashtube pass through the light field control member and in what direction.

2. The photoflash of the claim 1, further comprising a heat conductive member arranged on the bottom of the cavity and heat-conductively contacting the flashtube, and a heat dispersion member mounted on the side surfaces of the substrate; two opposite ends of the heat conductive member extending out of the substrate and heat-conductively contacting the heat dispersion member.

3. The photoflash of the claim 2, wherein a support wall surrounds the cavity and supports the light field control panel thereon; a plurality of electrically conductive poles embedded in the support wall and, each insulated from the others and electrically connected to a corresponding one of the circuits; a first and a second electrically conductive pads are respectively mounted on the top surfaces of the support wall at two opposite sides of the cavity and electrically connect the control circuit of the light field control member and the conductive poles.

4. The photoflash of the claim 2, wherein the heat conductive member is made of one of aluminum, copper and iron.

5. The photoflash of the claim 2, wherein the heat conductive member is a heat pipe.

6. The photoflash of the claim 2, wherein the heat dispersion members are heat sinks with a plurality of fins formed thereon.

7. The photoflash of the claim 3, wherein the light field control member further comprises two polarizing plates sandwiched between the transparent electrodes and the liquid crystal panel.

8. The photoflash of the claim 7, wherein the light field control member further comprises two glass substrates, one of the glass substrate is layered on one of the transparent electrodes, the other is sandwiched between the other transparent electrode and the polarizing plate.

9. The photoflash of the claim 8, wherein the liquid crystal panel is consisted of two opposite glass plates, two aligning films attached on opposite surfaces of the two glass plates correspondingly, and liquid crystal cells sealed between the two glass plates.

10. The photoflash of the claim 9, wherein one of the transparent electrodes is configured as a series of concentric conductive rings; each of the rings corresponds to one of the particular regions of the liquid crystal panel and is electrically connected to the control circuit, the rings are capable of being selectively controlled by the control circuit to formed various desired electrical fields in the particular regions thereby controlling the liquid crystal cells in the particular regions.

11. The photoflash of the claim 10, wherein a hemispheric resin lens is mounted on the surface of the glass substrate, facing the cavity for converging the transmitted light.

12. The photoflash of the claim 10, wherein a fresnel lens is attached on the surface of the glass substrate, facing the cavity for converging the transmitted light.

13. The photoflash of the claim 12, wherein the fresnel lens is nano-imprinted on the glass substrate.

* * * * *